Nov. 24, 1970
K. BRAUN
3,542,972
INDIVIDUALLY ADJUSTABLE MAGNET SYSTEMS OF A STEROPHONIC PICKUP
Filed July 3, 1968
2 Sheets-Sheet 1
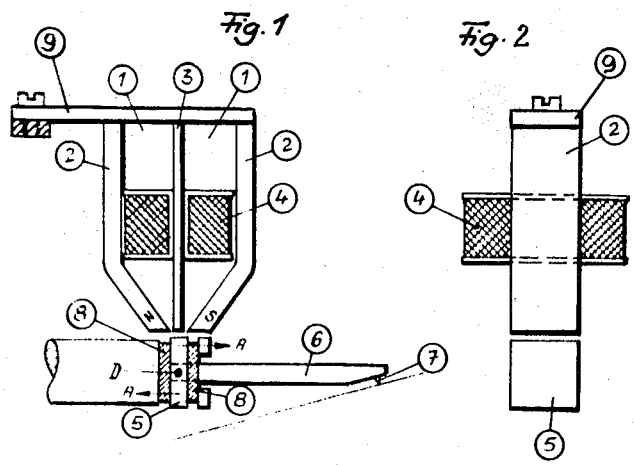
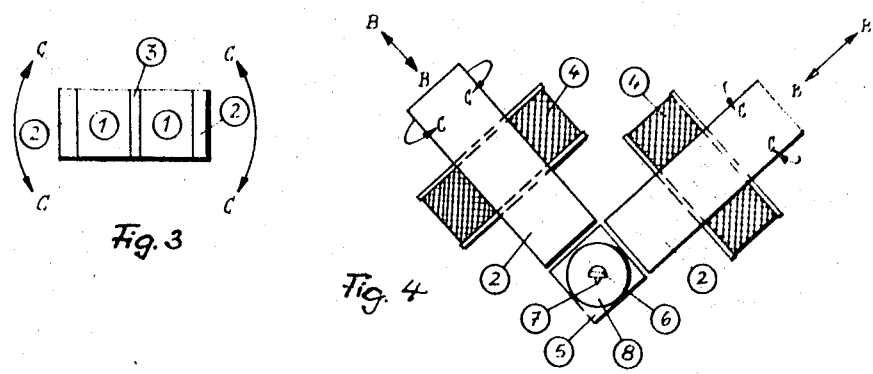
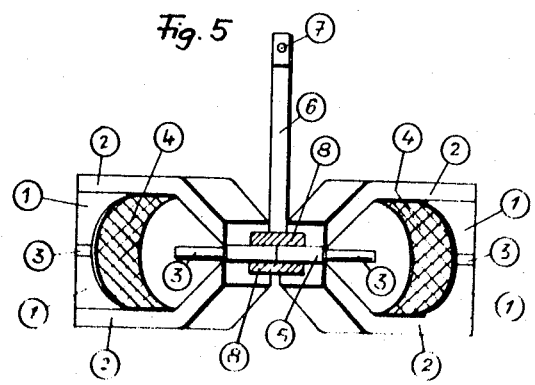
INVENTOR
Karl Braun
By
Attorney

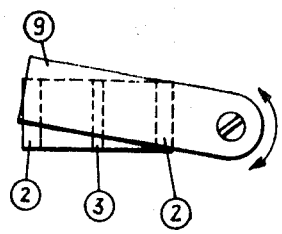
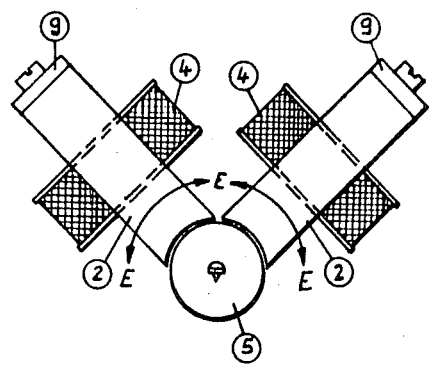

United States Patent Office
3,542,972
Patented Nov. 24, 1970

3,542,972
INDIVIDUAL ADJUSTABLE MAGNET SYSTEMS OF A STEREOPHONIC PICKUP
Karl Braun, 38 Passauer Strasse,
8399 Rotthalmunster, Germany
Filed July 3, 1968, Ser. No. 742,424
Claims priority, application Germany, July 5, 1967,
1,572,396
Int. Cl. H04r 11/12
U.S. Cl. 179—100.41                                    2 Claims

ABSTRACT OF THE DISCLOSURE

Electromagnetic pickup for stereophonic disc recording with two channels, providing a transducer in cooperation with two identical and independently adjustable magnet systems associated with the respective channels, and each system having two magnets with pole pieces of opposite polarity, and an intermediate leg with a coil.

---

The present invention relates to electromagnetic pickups for stereophonic disc recording in which the frequency response of the transducer arrangement can be altered by loading the damping device and in which an adjustment of the magnet air gaps is possible.

Magnetic pickups are already known in which a small permanent magnet oscillates on the inside of pole pieces equipped with coils, the permanent magnet being driven by the pickup or transmitting stylus by way of a needle arm. In such known pickups, only very modest values can be observed as regards equality of level and cross-talk attenuation, because no adjustment facilities are provided which would permit optimum results.

Furthermore, pickups are known in which an adjustment of the magnetic air gap is possible to a certain extent. In such pickups, the yieldable mount of the transducer, and consequently the frequency response, can be varied in known manner by compressing the damping rubber to a greater or lesser degree. Moreover, the level can be adjusted jointly for the two channels by varying the magnetic air gap, and the cross-talk attenuation can be kept approximately equal jointly for the two channels by twisting the transducer about its longitudinal axis.

By reason of the unavoidable manufacturing tolerances, however, it is not possible to obtain a precision pickup with optimum values if the critical values are adjusted jointly for the two channels. On the contrary, very considerable disadvantages occur in such pickups. In fact, it is not possible in these pickups to adjust the two channels to the same level independently of one another and regulate the cross-talk attenuation to the optimum value separately for each channel and independently of the other channel. Moreover, the yieldingness of the transducer cannot be kept as small as may be desired, since the transducer will otherwise tilt in the magnetic field common to the two channels. Also, in such known arrangements, the air gap cannot be kept very small in order to achieve good efficiency, because the windings and also the rubber damping system are arranged within the magnetic gap.

As the very small winding for each channel consists of two sections, cross-talk will be of a particularly high level if these two sections of a winding have not been wound exactly parallel, which cannot be achieved with certainty for reasons of manufacturing tolerance in view of the small dimensions of the coils. Moreover, for reasons of manufacturing tolerances, it is not possible to wind the winding for the second channel exactly at right angles or with the desired divergence in relation to the first channel and, because of this also, an optimum minimum cannot be obtained for the cross-talk.

The oscillating armature plate of the transducer is moreover so loaded in point of weight by the applied windings that a higher relative mass results at the needle point than would be the case with a non-wound transducer. In order to adjust the cross-talk attenuation of the two channels together, the complete transducer must be twisted and it may happen as a result that the pickup stylus will no longer be in its optimum position in relation to the surface of the disc or record, so that rather high pickup distortion may occur. Finally, in view of the very small winding space available and in view of the relative mass at the needle point, only a few windings can be applied to the transducer, as a result of which the voltages produced become so small that in every case step-up transformers must be employed for standard amplifiers.

The demands made of precision in stereophonic pickups are very high nowadays and it is the aim and object of the present invention to avoid the aforementioned defects of known pickups. The demand for high pickup capacity at high frequencies and accelerations as well as for good frequency response can be met in this case in known manner by employing suitable materials and a suitable damping arrangement and, moreover, the damping arrangement can be compressed to a greater or lesser degree.

The requirement of equal level within a series of systems and of equality of level of the two channels can be achieved with a high degree of accuracy only by means of an adjustment in the finished pickup. Furthermore, the requirement of high cross-talk attenuation for each channel separately and also so as to obtain equality in the two channels can be achieved only by means of adjustment in each channel independently of the other. To provide means to achieve these ends are further objectives of the present invention.

According to the invention, these objectives are achieved in that a separate, identical magnet system adjustable independently of the other magnet system is allocated to each channel of the stereophonic recording, with the magnet system comprising magnets, pole pieces, an intermediate leg and coils, and a transducer arrangement co-operates with the two magnet systems. The intermediate leg of each separate magnet system is preferably arranged in the neutral zone of the system and on it there is arranged a winding in which, on movement of the transducer arrangement in front of the gap of the magnet systems, voltages are induced in response to the movement of the transducer. The arrangement is advantageously so chosen that a common transducer consisting of soft magnetic material is provided for the two magnet systems.

In order to achieve the adjustability of the two channels on which the invention is based, each of the two magnet systems is designed to be so movable relative to the common transducer that the air gap is varied for the respective channel and each channel is thereby independently adjustable to the same level. Moreover, by employing a magnetic shunt in each of the two magnet systems, it is possible to obtain a change in the level. Furthermore, the arrangement is such that by twisting or tilting each of the two magnet systems relative to the transducer, the cross-talk is adjustable separately for each cahnnel and independently of the other channel to an optimum, i.e., the smallest possible, value.

Moreover, the electromagnetic pickup is so designed according to the invention that the axial position of the needle arm, and consequently the optimum position of the pickup stylus, remains unchanged when adjustments are made in the level and the cross-talk attenuation. The magnets and the transducer are furthermore so arranged that, even with an extremely small restoring force and a high yieldingness, tilting or sticking of the transducer in the magnetic field is impossible.

Due to the adjustment possibilities of the magnet systems and the transducer, all inaccuracies which occur owing to the unavoidable tolerances in the manufacture of pickups can be eliminated, so that the pickup according to the invention fully satisfies the high demands mentioned earlier.

The invention is described hereinafter with reference to an embodiment in conjunction with the drawings, in which:

FIG. 1 is a side view of a magnet system for a stereophonic pickup;

FIG. 2 is an end view of the same magnet system;

FIG. 3 is a bottom view of the magnet system;

FIG. 4 is a side view of an arrangement providing two magnet systems offset from each other;

FIG. 5 is a top view of the magnet system arrangement of FIG. 4;

FIG. 6 shows a modified form of a dual magnet system arrangement; and

FIG. 7 is a diagrammatic partial view similar to that of FIG. 4 of the arrangement according to FIG. 6.

As shown, the stereophonic pickup comprises two like magnet systems which are mechanically and electromagnetically independent of one another. Each system includes magnets 1, pole pieces 2 and an intermediate leg 3 of magnetically soft material which is arranged in the neutral zone of the magnets. Arranged on the intermediate leg 3 is a coil 4 in which voltages are induced when the transducer, in the form of a square or circular iron plate 5, is driven by the pickup stylus 7 through the needle arm 6. Thus, if the transducer 5 is moved to and fro in the direction A—A, that is about the pivot D (FIG. 1), an alternating magnetic flux is produced in the intermediate leg 3 of the magnet system and induces an alternating-current voltage in the coil 4.

By shifting the two magnet systems in the direction B—B (FIG. 4), for example by means of set screws, eccentrics or the like known means (not shown), the air gap betwen either magnet system and the armature plate 5 can be so varied that the levels of the two channels become absolutely equal and also the absolute levels of all the pickups within a series always have the same exact value.

This equality of level can also be obtained by employing magnetic shunts in each of the two magnet systems, as is shown by way of example in FIGS. 1 and 7 in the form of a magnetic short-circuiting bridge 9.

The iron plate 5 of the transducer is mounted between two rubber discs 8, whereby the restoring constant of the transducer is produced. By compressing these rubber elements 8 to a greater or lesser degree, the damping and yieldingness of the transducer and, consequently, the frequency response are controlled in known manner.

In the arrangement of the two magnet systems at right angles to each other (FIG. 4), when the armature plate 5 generates full voltage in one system by reason of its movement, no voltage is generated in the other system at the same direction of movement of the transducer, since in that case, and considering the intermediate leg 3, as many lines of force are picked up by the north pole of the magnet as by the south pole thereof. Thus, with this direction of movement of the transducer, no alternating magnetic field is formed in the intermediate leg 3 and, consequently, no alternating-current voltage is produced in the coil 4. However, this is true only if the magnet systems are so adjusted with respect to the position of the oscillating iron plate 5, for example by twisting in the direction C—C or E—E (FIGS. 4 and 7), that the magnitudes of the magnetic fields picked up actually cancel each other. Thus, in FIG. 7, the magnet systems are at 9 mounted for individual turnable adjustment about the axis about which the transducer 5 is movable and the magnet systems have pole faces which cooperate with the transducer 5 and are concentric with the circular periphery of the latter.

As this adjustment can easily be carried out separately for each magnet system by conventional means, such as screws, eccentrics or the like (not shown), the result obtained is that the cross-talk can be adjusted in optimum manner for each channel independently of the other channel to the minimum which is technically achievable.

To be able to operate at small bearing forces with a stereophonic pickup, the restoring constant must be made very small. In the pickup according to the invention, this is possible within wide limits, since by reason of the free-oscillator prinicple chosen, i.e. with movement of the armature in front of the magnet gap instead of within the field, tilting or sticking of the armature is avoided with certainty. In spite of this, the air gaps between the transducer and the magnet systems can be made so small that very good efficiency is obtained. Moreover, since in the construction according to the invention there is a relatively large amount of winding space within the two magnet systems, sufficient voltage can be generated that this pickup can be operated on conventional amplifiers and without auxiliary step-up transformers.

The invention may be carried out in other specific ways than those herein set forth without departing from the spirit and essential characteristics of the invention, and the present embodiments are, therefore, to be considered in all respects as illustrative and not restrictive.

What is claimed is:

1. Electromagnetic pickup for reproduction of a stereophonic disc recording with two channels, having a transducer mounted for movement about an axis and provided with an outer periphery circular about said axis, two magnet systems having pole faces cooperating with said armature, means mounting said magnet systems for individual turnable adjustment about said axis, with said pole faces of said magnet systems being concentric with said armature periphery.

2. Electromagnetic pickup as in claim 1, in which each magnet system encludes a leg intermediate said pole faces and located in the neutral zone of the magnet system, with said leg also having a face concentric with said armature periphery.

References Cited

UNITED STATES PATENTS 2,553,715  5/1951  Miller _____ 179—100.41
3,005,060  10/1961  Weathers _____ 179—100.41

BERNARD KONICK, Primary Examiner

R. F. CARDILLO, JR., Assistant Examiner